(12) United States Patent
Looser et al.

(10) Patent No.: US 7,134,215 B2
(45) Date of Patent: Nov. 14, 2006

(54) MEASURING DEVICE FOR MEASURING GEARING AND DIAMETERS IN ROTATIONALLY SYMMETRICAL COMPONENTS

(75) Inventors: Willi Looser, Langenargen (DE); Reinhold Schilling, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/527,477

(22) PCT Filed: Sep. 13, 2003

(86) PCT No.: PCT/EP03/10202

§ 371 (c)(1),
(2), (4) Date: Mar. 11, 2005

(87) PCT Pub. No.: WO2004/028669

PCT Pub. Date: Apr. 8, 2004

(65) Prior Publication Data

US 2005/0262715 A1  Dec. 1, 2005

(30) Foreign Application Priority Data

Sep. 21, 2002 (DE) ............................... 102 44 025

(51) Int. Cl.
*G01B 5/08* (2006.01)

(52) U.S. Cl. .................................................. 33/501.11
(58) Field of Classification Search .............. 33/501.11
See application file for complete search history.

(56) References Cited

U.S. PATENT DOCUMENTS

| 2,561,534 | A |   | 7/1951  | Parker et al. |
| 2,728,144 | A |   | 12/1955 | Nilsson |
| 2,909,844 | A | * | 10/1959 | Wagner ................... 33/501.17 |
| 3,589,018 | A |   | 6/1971  | Thompson et al. |
| 3,771,229 | A |   | 11/1973 | Reef |
| 4,265,026 | A | * | 5/1981  | Meyer ......................... 33/542 |
| 5,546,666 | A |   | 8/1996  | Och |
| 6,901,676 | B1| * | 6/2005  | Macke ......................... 33/555 |

FOREIGN PATENT DOCUMENTS

| DE | 832 500       | 2/1952  |
| DE | 1 218 737     | 9/1967  |
| DE | 28 57 492     | 8/1980  |
| DE | 43 26 406 C1  | 12/1994 |
| WO | WO-79/00291   | 5/1979  |

\* cited by examiner

*Primary Examiner*—Christopher W. Fulton
(74) *Attorney, Agent, or Firm*—Davis & Bujold, P.L.L.C.

(57) ABSTRACT

A measuring device for measuring gearing and diameters in rotationally symmetrical components (2). The device possesses a fixed feeler pin (9) and a movable feeler pin (10). The movable feeler pin (10), with the aid of a spring actuated mechanism (14), automatically confines the measurable component (2) in a defined measurement position.

14 Claims, 2 Drawing Sheets

1

Figure 1:
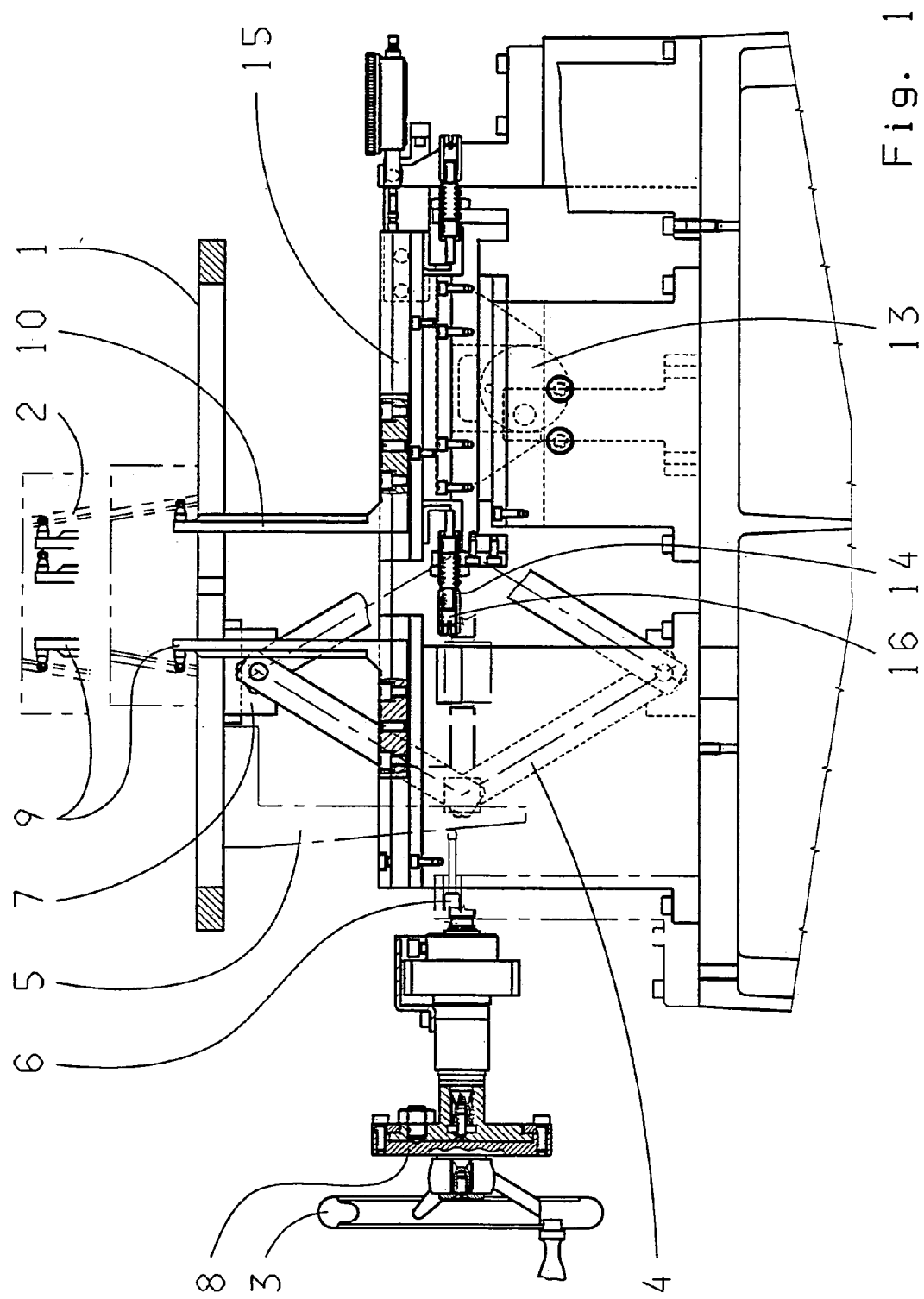

MEASURING DEVICE FOR MEASURING GEARING AND DIAMETERS IN ROTATIONALLY SYMMETRICAL COMPONENTS

This application is a national stage completion of PCT/EP2003/010202 filed Sep. 13, 2003 which claims priority from German Application Serial No. 102 44 025.5 filed Sep. 21, 2002.

FIELD OF THE INVENTION

The invention concerns a measuring device for the measurement of gearing and diameters of rotationally symmetrical components to be measured.

BACKGROUND OF THE INVENTION

Measurement devices of the state of the technology, adaptable for the measurement of gearing and diameters of rotationally symmetrical components, have been established and known for a considerable time. With these so-called universal measurement apparatuses, it is possible to determine inside and outside diameters, sphericities of inside and outside gearing as well as heights. These universal measurement apparatuses are predominately intended for installation in specialized measurement-rooms and are suitable for measuring components with a maximum diameter of some 300 mm. The measurement equipment in use possess a fixed and a movable feeler pin. The component is positioned against the fixed feeler pin and with the aid of the moveable feeler pin, is brought into its final setting, i.e., the measurement position. This can be carried out manually or by spring adjustment.

Measurement devices conforming to the state of the technology are inappropriate for large, heavy components and are considered to be only conditionally usable under shop conditions. Generally the so described measurement devices require special measurement rooms, which are isolated from external conditions. In the case of sizable and heavy components, the movable feeler pin is generally inoperable with regard to bringing the component into a position for measurement. The result of this can be reflected in faulted measurement results. Further, the danger is present that the feeler pin becomes deformed, because of strong mechanical loadings, whereby the measurement equipment finds itself in need of frequent repair. Since the measurement device frequently allows only small movements of the feeler pin equipment, installation and removal of heavy components can also be a source of damage.

The present invention has the purpose of making a measuring device available with which sphericity measurements of inner and outer gearing, as well as inside and outside diameters of cylindrical and conical components, can be precisely determined, which device is sturdily constructed and is adaptable for direct application in the workplace. Especially, the invented measurement device should have the capability of correctly measuring large and heavy components.

The stated purpose of the invention is achieved by a generic measurement device and which the device is applicable to the measurement of gearing and diameters of rotation-symmetrical components.

SUMMARY OF THE INVENTION

By way of mechanical stability in the construction of the measurement device as well as its component feeler pins, the components may be placed directly on the surface plate of the table of the device. This enables a greater degree of monitoring with little loss of time and power. The component to be measured can be laid on a measuring surface plate at a convenient working height and by way of a manipulation apparatus which acts upon the automobile jack principle, the component can be positioned by the measurement feelers. The height-adjustable measurement device also possesses operational aids on its upper surface, such as conveyor rollers, by way of which the component under examination can be easily positioned. This component need not be brought into a predefined measurement position; much more the component is initially simply placed approximately between the fixed and movable feeler pins. By way of the activation of the actual measurement procedure, the component will then be pressed against the fixed feeler pin, thus acquiring a specified measurement position by displacement by the movable feeler pin. The activation can be done, for example, by the pivoting of a lever, which positions the movable feeler pin by way of an eccentric disk. For this purpose, a spring-force activated mechanism forces the movable feeler pin against the component. The spring force which, in the following, will also be termed "measurement force" can be steplessly applied and in like manner, also corrected. By way of an ample clearance of the movable feeler pins from the component, an easy insertion and removal of the component is assured and simultaneously both the measurement device and the component are protected from damage. Since the moveable feeler pin has a large zone of free travel to obtain measurements, the principal operation of the equipment allows gearing and diameter measurements to be determined, as well as dimensions of conical gearing, structural parts, steps, perforations and borings. For this purpose, the measuring equipment possesses a movable table, the length of which can be bounded by limit switches. In a case of overstepping the limits, a slip clutch is activated, which prevents damage. The movement of the table can be read off from a graduated scale on a measurement dial. The motion of the measuring table can be accomplished either manually or with the aid of outside force. A reduction of uncertainties and measurement error is achieved by way of the simple operation and the automatic positioning of the workpiece during the measurement.

Advantageous and useful embodiments of the invention are made evident in the subordinate claims. The invention, however, is not limited by the combination of features exhibited in the claims, but much more, it makes available for the expert, within the statement of purpose, additional significant possibilities for combinations and individual claim features.

BREIF DESCRIPTION OF THE INVENTION

Figure 2:
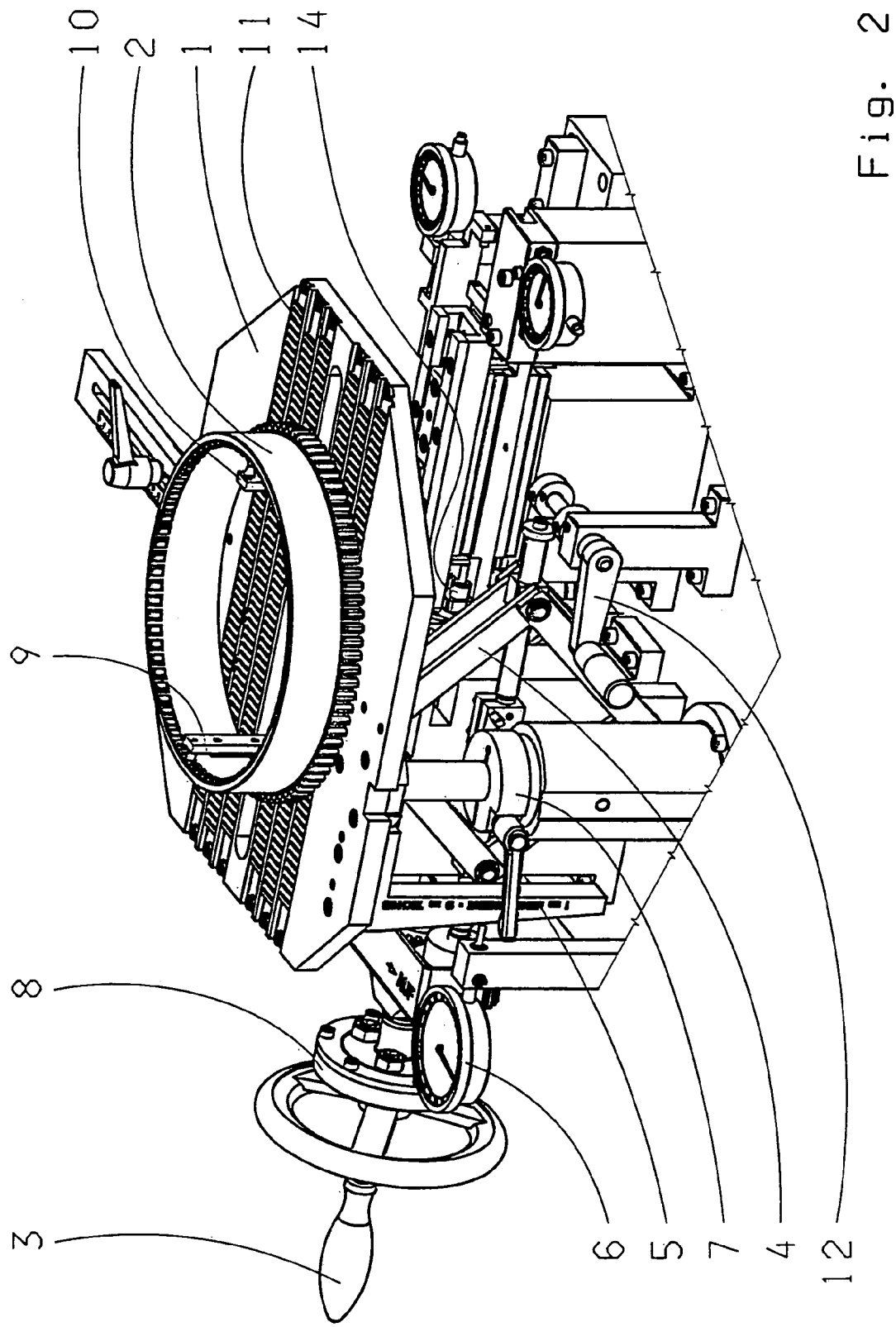

The invention will now be described, by way of example, with reference to the accompoanying drawings in which:

FIG. 1 is a section through an invented measurement device or the measurement of gearing and diameters in the case of rotation-symmetrical components; and FIG. 2 is a three dimensional view of the invented measurement device which is shown in FIG. 1.

DETAILED DESCRIPTION OF THE INVENTION

FIG. 1 shows a component 2 comprising a gear with conical, internal toothing, which gear has been placed upon a measuring table 1. By way of a hand operated crank 3, the measurement table 1 can be raised to its necessary measuring height. This raising done by a lifting apparatus 4 which, in this case, is operated as a scissors-linkage. The linear displacement of the measurement table 1 can be read from a graduated scale 5 on a measurement dial 6. A horizontal movement of the table can be confined to an optional length by way of limit switches 7. If these limit switches 7 are impinged upon, then a slip clutch 8 is activated, which prevents an overrun of the limit switches 7. The component 2 is prepositioned in an approximate location between a fixed feeler pin 9 and a movable feeler pin 10. The measurement procedure is initiated by the displacement of a lever 12 which moves an eccentric disk 13. A spring actuated mechanism 14 displaces the movable feeler pin 10 with the aid of an apparatus 15 in the form of a linear slide arrangement, by way of which the component 2 is fixed in its position. The measuring force of the spring actuated mechanism 14 can be steplessly adjusted via a screw 16.

FIG. 2 shows the component 2 on the measurement table 1 where said component lies in its preposition between the fixed feeler pin 9 and the movable feeler pin 10. The prepositioning is eased by a friction diminishing aid 11, in this case, depicted as a roller framing, which framing is integrated into the surface of the measuring table 1. By the displacement of a lever 12, the actual measurement procedure is initiated. The spring activated mechanism 14 is caused to function via the eccentric disk 13 which, with the aid of spring force, places the movable feeler pin 10 in its measuring position. The spring force can be applied in a stepless manner by way of a threaded arrangement and, if necessary, can be corrected. The movable feeler pin 10 extends itself outward and brings the component 2 into its measurement position. Because of its active measuring path, the movable feeler pin 10 can also circumscribe the inside contour and examine the inner gearing of the of the component 2. For this purpose, the movable measurement feeler pin 10 is brought into its upward position by a renewed displacement of the lever 12. The measurement table 2, with the aid of the lifting apparatus 3, is placed in a respectively different measuring position by the crank 3. The measurement procedure can be o. reactivated many times by repeated adjustment of the lever 12 which activates the positioning and the elevation of the movable feeling pin 10.

REFERENCE NUMERALS 1 measuring table
2 component (the workpiece to be measured)
3 manual crank
4 lifting apparatus
5 graduated scale
6 measurement dial
7 limit switches
8 slip clutch
9 fixed feeler pin
10 moveable feeler pin
11 assist means
12 lever
13 eccentric disk
14 spring actuated mechanism
15 apparatus
16 screw

The invention claimed is:

1. A measuring device for measuring gearing and diameters of rotationally symmetrical components (2) with a fixed feeler pin (9) and a movable feeler pin (10), the component (2), with the aid of a spring actuated mechanism (14), which when activated by an auxiliary mechanism, is pressed by the movable feeler pin (10) against the fixed feeler pin (9) and thus is brought into a defined position for measurement, the auxiliary mechanism possesses a pivotal lever (12), which, by means of an eccentric disk (13) positions the movable feeler pin (10) in a measuring position.

2. The measuring device according to claim 1, wherein the component (2), is guided to the fixed feeler pins (9) and the movable feeler pin (10) by a raising apparatus (4), which is attached to a measurement table.

3. The measuring device according to claim 2, wherein the raising apparatus (4) possesses at least one end detent (7), with which a defined stroke can be adjusted.

4. The measuring device according to claim 3, wherein upon an overriding of the end detent (7), a slip clutch (8) is activated, in order to avoid damage.

5. The measuring device according to claim 2, wherein a travel distance of the lifting apparatus (4) can be read from marked calibrations (5) on a measurement dial (6).

6. The measuring device according to claim 2, wherein a motion of the lifting apparatus (4) can be done manually or by outside force.

7. The measuring device according to claim 1, wherein the measurement table (1) possesses on a surface a friction reducing arrangement (11), whereby the component (2) can be easily positioned.

8. A measuring device for accurately positioning and measuring gearing and diameters of rotationally symmetrical components (2), the device comprising;
   a support table upon which the component (2) is axially supported and radially adjustable;
   a fixed feeler pin (9) and a movable feeler pin (10) moveable relative to the support table;
   a component positioning mechanism for adjusting the component (2) to press the component (2) against the fixed feeler pin (9) thus bringing the component (2) into a defined measurement position on the support table, the component positioning mechanism comprising;
   a lever actuating an eccentric disc which via a spring mechanism (14) moves a linear slide to engage the movable feeler pin (10) with the component and radially adjust the component into the defined measurement position.

9. The measuring device according to claim 8 wherein the component (2) is axially adjustable relative to the fixed feeler pins (9) and the movable feeler pin (10) by a raising apparatus (4) connected to the support table.

10. The measuring device according to claim 9, wherein the raising apparatus (4) possesses at least one end detent (7), with which a defined stroke can be adjusted.

11. The measuring device according to claim 10, wherein upon an overriding of the end detent (7), a slip clutch (8) is activated, in order to avoid damage.

12. The measuring device according to claim 8, wherein a travel distance of the lifting apparatus (4) can be read from marked calibrations (5) on a measurement dial (6).

13. The measuring device according to claim 8, wherein a motion of the lifting apparatus (4) can be done manually or by outside force.

14. A measuring device for measuring gearing and diameters of rotationally symmetrical components (2) with a fixed feeler pin (9) and a movable feeler pin (10), whereby the component (2), with the aid of a spring actuated mechanism (14), which when activated by an auxiliary mechanism, is pressed by the movable feeler pin (10) against the fixed feeler pin (9) and thus is brought into a defined position for measurement the auxiliary mechanism possesses a pivotal lever (12), which, by means of an eccentric disk (13) positions the movable feeler pin (10) in a measuring position; and wherein the component (2), is guided to the fixed feeler pins (9) and the movable feeler pin (10) by a raising apparatus (4), which is attached to a measurement table and the raising apparatus (4) possesses at least one end detent (7), with which a defined stroke can be adjusted, and 21 slip clutch (8) is activated, upon an overriding of the end detent (7), to avoid damage.

* * * * *